United States Patent
Takahashi

(10) Patent No.: US 9,800,858 B2
(45) Date of Patent: Oct. 24, 2017

(54) STEREO CAMERA UNIT

(71) Applicant: SUBARU CORPORATION, Tokyo (JP)

(72) Inventor: Yasushi Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 169 days.

(21) Appl. No.: 14/189,745

(22) Filed: Feb. 25, 2014

(65) Prior Publication Data
US 2014/0267621 A1 Sep. 18, 2014

(30) Foreign Application Priority Data

Mar. 18, 2013 (JP) .................. 2013-054833

(51) Int. Cl.
H04N 13/02 (2006.01)
H04N 5/225 (2006.01)

(52) U.S. Cl.
CPC ....... *H04N 13/0203* (2013.01); *H04N 5/2253* (2013.01); *H04N 13/0239* (2013.01); *H04N 2213/001* (2013.01)

(58) Field of Classification Search
CPC ............ H04N 13/0203; H04N 5/2253; H04N 13/0239; H04N 2213/001
USPC ......................................... 348/46
See application file for complete search history.

(56) References Cited

U.S. PATENT DOCUMENTS

| | | | |
|---|---|---|---|
| 7,106,365 B1* | 9/2006 | Sogawa | B60R 1/00 348/148 |
| 8,243,123 B1* | 8/2012 | Geshwind | H04N 13/0022 348/42 |
| 8,432,486 B2* | 4/2013 | Yasuda | H04N 5/2252 348/373 |
| 8,638,386 B2* | 1/2014 | Mukai | H04N 5/2254 348/335 |
| 2003/0169918 A1* | 9/2003 | Sogawa | H04N 13/0239 382/154 |
| 2009/0268013 A1* | 10/2009 | Katahira | G03B 35/08 348/46 |
| 2012/0268569 A1* | 10/2012 | Kurokawa | H04N 13/0239 348/47 |
| 2013/0213697 A1* | 8/2013 | Palaniswamy | H01L 33/486 174/254 |

FOREIGN PATENT DOCUMENTS

JP 2009-265412 A 11/2009

* cited by examiner

*Primary Examiner* — Gelek W Topgyal
(74) *Attorney, Agent, or Firm* — McDermott Will & Emery LLP

(57) ABSTRACT

A stereo camera unit includes a camera stay, a pair of lenses fixed to the camera stay, image-capturing devices for receiving light condensed by the lens, and a mount board mounting the image-capturing devices. The mount board is fixed to the camera stay via fastening members such as a screw, whereby the relative position of the lens with respect to the image-capturing device is determined. A metal core substrate having a same metal material as the camera stay in a core layer is employed for the mount board.

13 Claims, 4 Drawing Sheets

STEREO CAMERA UNIT

CROSS-REFERENCE TO RELATED APPLICATIONS

The present application claims priority from Japanese Patent Application No. 2013-054833 filed on Mar. 18, 2013, the entire contents of which are hereby incorporated by reference.

BACKGROUND

1. Technical

The present invention relates to a stereo camera unit used for three dimensional measurement, and more particularly, to a stereo camera unit in which multiple image-capturing devices are fixed to a camera stay with predetermined arrangement.

2. Related Art

In a known image processing method as a three dimensional measurement technique using images, has been known, in which a target object is captured by right and left cameras (stereo camera unit) from different positions and correlation between both of the images is derived on the basis of the pair of images captured so that a distance is calculated from parallax of the object. In this kind of image processing, a so-called stereo method is used. In the stereo method, camera parameters set in advance such as a focal point distance and an interval (camera base line length) between light receiving surfaces of image sensors provided in the camera are used to derive the distance between the stereo camera and the target object, based on the principle of triangulation. In the image processing according to the stereo method, successively shifting and overlapping two image signals obtained from the stereo cameras, and the position where the two image signals match each other is derived.

The precision of the distance measured based on the stereo method depends on the precision of the position where the cameras are attached. Therefore, if the positions of the light receiving surface of the cameras are displaced, error occurs between the measurement distance and the actual distance.

Japanese Unexamined Patent Application Publication No. 2009-265412 describes a technique for reducing the error. Specifically, with reference to FIG. 3 and its related description therein, a bottom surface 13a, a right side wall 13c, and a lower side wall 13d of a sensor accommodating unit 13 provided in a camera main body 11 disposed on a camera stay 4 are used as layout reference surfaces for a back surface, a right side surface and a lower side surface of an image sensor 12. Accordingly, the back surface of the camera main body 11 is pressed onto the bottom surface of the sensor accommodating unit 13 by elastic force of the elastic sheet 18, whereby the position thereof is accurately fixed.

However, the cameras used in the technique sometimes cannot be preferably fixed to the camera stay.

Specifically, in the above technique, a relatively large charge coupled device (CCD) sensor is used as an image sensor used for the stereo method. Therefore, urging force of the elastic member is used to bring a particular portion of the sensor itself into contact with another portion of the camera unit, whereby the sensor can be positioned.

However, a complementary metal oxide semiconductor (CMOS) sensor is used as an image-capturing device in place of the CCD in some cases. Even when the CMOS sensor captures an image against the sunlight, smear does not occur in the principle, and therefore, this is suitable for vehicle image sensor. When compared with a CCD sensor, the CMOS sensor is small, and therefore, it is difficult to place the small CMOS sensor at a particular position of the stereo camera unit with urging force of the elastic member.

A solution to this problem is a structure where a small CMOS sensor is mounted on a mount board, and this mount board is fixed to the camera stay. However, in general, the mount board made of glass epoxy and the camera stay made of metal such as aluminum have different thermal expansion rates. Specifically, the thermal expansion rate of the camera stay made of aluminum is $22 \times 10^{-6}$/degrees, whereas the thermal expansion rate of the mount board made of glass epoxy is $15 \times 10^{-6}$/degrees. Accordingly, the expansion rates of them both due to temperature change are different, and the relative position between the lens fixed to the camera stay and the CMOS sensor mounted on the mount board is changed, and therefore, obtained images are also affected by this deviation. In this case, the position of the epipolar line derived from the image is disturbed. Thus, when a matching point of the right image is searched with the left image according to the stereo method, the matching point cannot be found, and it is impossible to calculate correct distance data.

Still further, when resin material is used for the mount board, creep occurs, and with this creep, even when axial force is applied to the mount board with a bolt, the bolt is loosened because of the thinned mount board, and the position of the image-capturing device mounted on the mount board may be deviated from a predetermined position.

BRIEF SUMMARY OF THE INVENTION

The present invention is made in view of the above problems, and it is an object of the present invention to provide a stereo camera unit capable of accurately calculating distance data.

An aspect of the present invention provides a stereo camera unit including: a camera stay; a pair of lenses fixed to the camera stay and configured to condense light incident from the outside; image-capturing devices disposed in association with the pair of lenses and receiving light condensed by the lenses; and mount boards each mounting the image-capturing device, the mount board being fixed to the camera stay. A metal core substrate in which same type of metal as the camera stay is used as core base material is employed as the mount board.

BRIEF DESCRIPTION OF THE DRAWINGS

FIG. 1A is a front view of the stereo camera unit, and FIG. 2B is a block diagram illustrating an electrical configuration of the stereo camera unit;

DETAILED DESCRIPTION

Hereinafter, a camera unit according to an implementation of the present invention will be described with reference to drawings. In the description below, UP denotes an upper direction, DOWN denotes a lower direction. LH denotes a left direction when a vehicle faces a travelling direction, and RH denotes aright direction in the same case. FR denotes a forward direction, and RE denotes a backward direction.

Figure 1A:
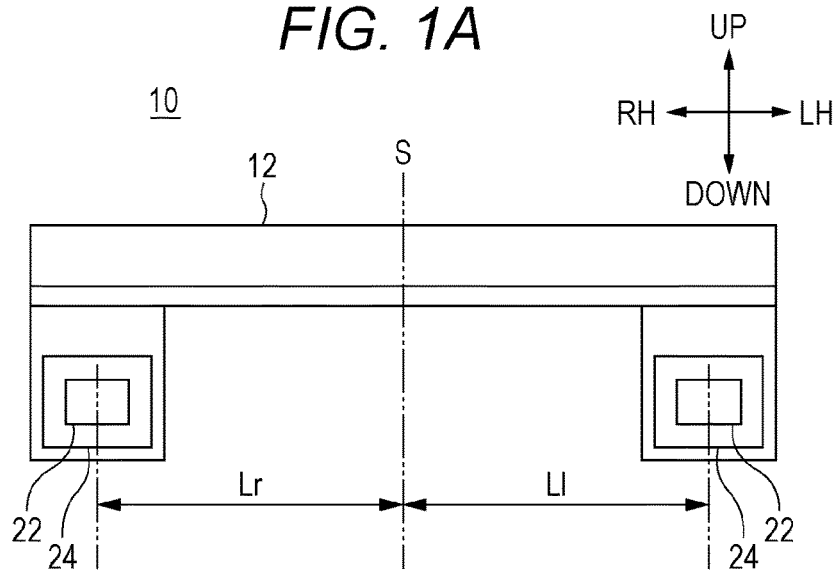
FIGS. 1A and 1B illustrate a stereo camera unit according to an implementation of the present invention.

With reference to FIG. 1A, a stereo camera unit 10 according to the present implementation is disposed at a predetermined portion on the upper front in a vehicle cabin. The stereo camera unit 10 has a function of calculating a distance between the vehicle and an object in front of the vehicle, on the basis of an image of the forward of the vehicle that is captured through a windshield. The vehicle having the camera unit according to the present implementation uses the obtained distance information to, for example, issue a vehicle distance warning to a user, activate a brake, prevent an erroneous start of the vehicle, and perform control for following a preceding vehicle.

The stereo camera unit 10 mainly includes a pair of image-capturing devices 22 disposed right and left, a camera stay 12 to which the image-capturing devices 22 are fixed, and mount boards 24 fixed to the camera stay 12. The mount boards 24 mount the image-capturing devices 22. One of the two image-capturing devices 22 functions as a main camera, and the other of them functions as a sub-camera.

The camera stay 12 is manufactured with a central line S as a reference position, and an upper surface close to the central line S is fixedly installed on a front rail of the vehicle with an unillustrated adjustable plate interposed therebetween. The camera stay 12 is made of aluminum or alloy mainly including aluminum, and is manufactured by, e.g., machining or die-casting. The entire camera stay 12 may be integrally formed, or may be made by welding or connecting multiple members.

A distance Lr from the central line S of the camera stay 12 to the center of the image-capturing device 22 disposed on the RH side is the same as a distance L1 from the central line S of the camera stay 12 to the center of the image-capturing device 22 disposed on the LH side.

Figure 1B:
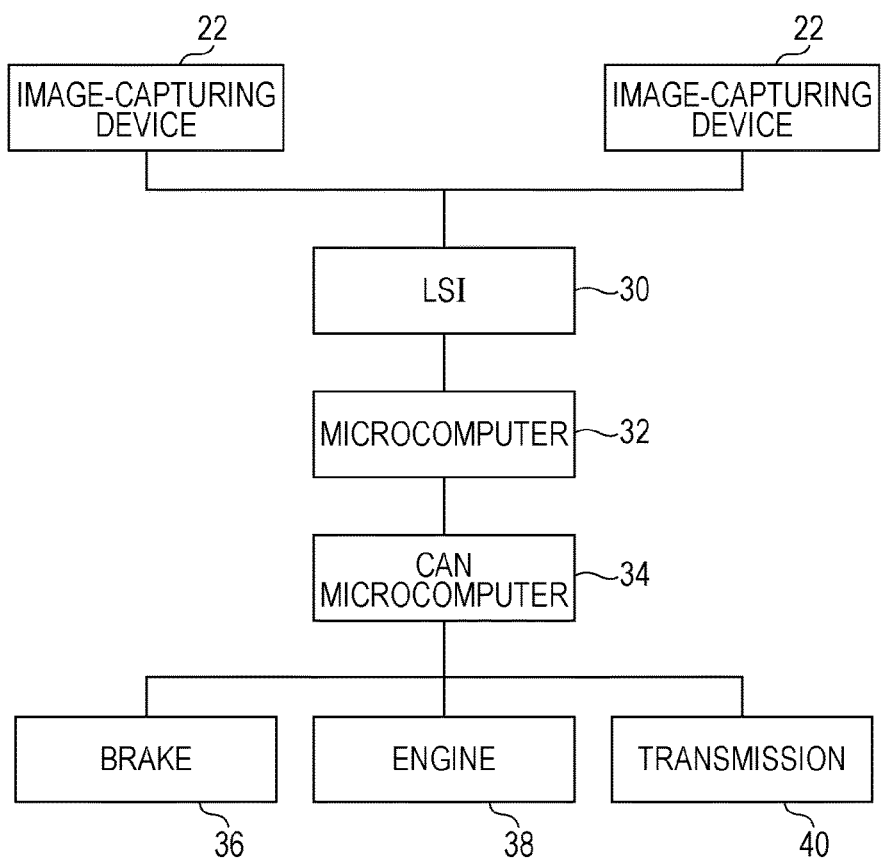

With reference to FIG. 1B, the vehicle having the stereo camera unit 10 calculates distance data with an LSI 30 for stereo image processing, on the basis of image data obtained from the pair of image-capturing devices 22. Then, a microcomputer 32 detects an object in front of the vehicle on the basis of the distance data. Further, on the basis of the result of the object detection, a controller area network (CAN) microcomputer 34 controls a brake 36, an engine 38, and a transmission 40 through a CAN. The LSI 30 and the microcomputer 32 performing the calculations described above are fixed to another mount board incorporated into the camera stay 12.

Figure 2:
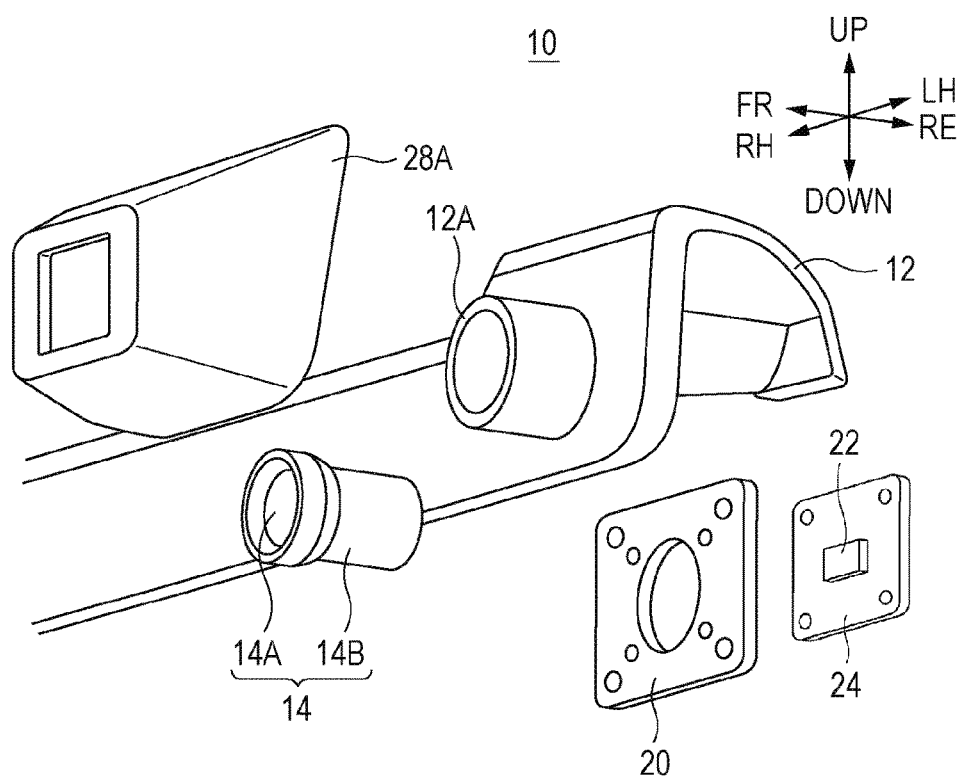
FIG. 2 is a perspective view of the stereo camera unit according to the implementation of the present invention, illustrating a configuration where an image-capturing device and the like are accommodated in a camera stay.

With reference to FIG. 2, a configuration will be described, in which the mount board 24 mounting the image-capturing device 22 is incorporated into an end portion of the camera stay 12. This figure illustrates the portion where the mount board 24 is accommodated in the end portion on the LH side of the camera stay 12, but the mount board 24 and the like are likewise accommodated at the end portion of the RH side of the camera stay 12 in the same configuration.

At the end portion of the LH side of the camera stay 12, a space is provided for accommodating the image-capturing device 22 mounted on the mount board 24. A cylindrical lens fixing unit 12A is provided on the external periphery on the FR side of the end portion of the LH side of the camera stay 12. The interior of the lens fixing unit 12A is in communication with an internal space of the main body of the camera stay 12.

The lens 14 includes a lens main body 14A and a cylindrical lens holder 14B accommodating the lens main body 14A. The lens holder 14B is inserted into the lens fixing unit 12A, and the lens holder 14B is fixed to the lens fixing unit 12A with a fastening member such as a screw, adhesive agent or the like, whereby relative positioning is achieved between the lens main body 14A and the camera stay 12.

A lens hood 28A is a cover fixed with a screw to cover the camera stay 12 at a portion where the lens fixing unit 12A is provided, and protects the lens 14 fixed to the lens fixing unit 12A. An opening is provided in the surface on the FR side of the lens hood 28A.

The interior of the camera stay 12, which corresponds to the portion where the lens fixing unit 12A is provided, a fixing plate 20 and the mount board 24 are accommodated at predetermined positions.

The mount board 24 is mounts the image-capturing device 22 for receiving light entering into the inside of the camera stay 12 via the lens 14. The mount board 24 is a metal core substrate having core base material, the details of which will be described later. The mount board 24 has multiple holes at positions enclosing the image-capturing device 22, and the mount board 24 is fixed to the camera stay 12 with fastening members such as screw penetrating the holes.

The image-capturing device 22 is a CMOS image sensor. When light condensed by the lens main body 14A is cast upon the light receiving surface of the image-capturing device 22, the image-capturing device 22 performs photoelectric conversion, and an electric signal obtained therefrom is output to a calculation device.

The fixing plate 20 is disposed between the inner wall of the camera stay 12 and the mount board 24. Examples of materials that can be used for the fixing plate 20 include resin material such as epoxy resin and metal material such as aluminum. The fixing plate 20 is interposed between the camera stay 12 and the mount board 24 to correct distortion of the image captured by the image-capturing device 22 by making the relative positional relationship between the lens main body 14A and the image-capturing device 22 into a predetermined relationship.

Figure 3:
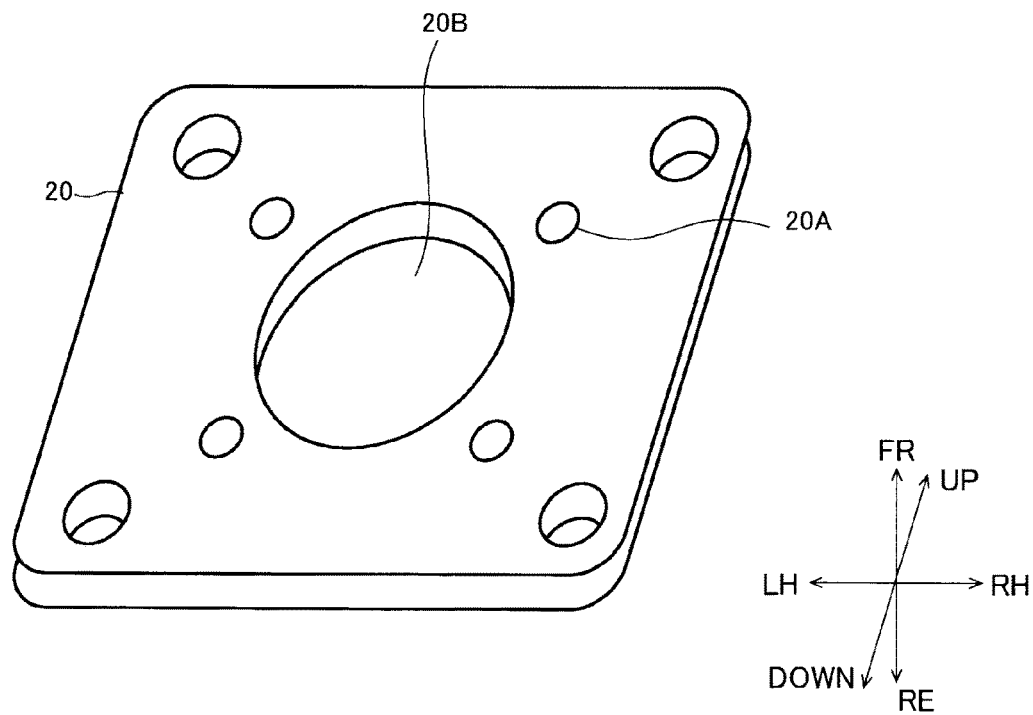
FIG. 3 is a perspective view of the stereo camera unit according to the implementation of the present invention, illustrating the configurational relationship between a fixing plate and a mount board on which an image-capturing device is mounted.
Figure 3:
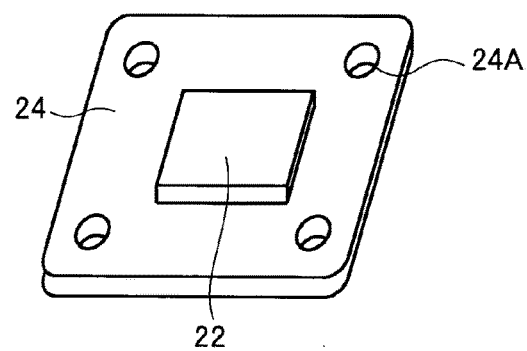

With reference to FIG. 3, the configuration of the relationship between the mount board 24 and the fixing plate 20 will be described.

The mount board 24 has multiple holes 24A, and the mount board 24 is fixed to the camera stay 12 with screws (fastening members) penetrating the holes 24A. In this implementation, four holes 24A are illustrated to enclose the region where the image-capturing device 22 is mounted, but the number of holes 24A is not particularly limited. The mount board 24 has a connector (not illustrated), and the image-capturing device 22 is electrically connected to the LSI and the like described above via a flexible circuit board connected to the connector.

The fixing plate 20 has an opening 20B for passing light condensed by the lens 14, and the opening 20B overlaps the image-capturing device 22 mounted on the mount board 24. The size and the shape of the fixing plate 20 as seen in the top view may be approximately same as those of the mount board 24. Light incident from the outside when the stereo camera unit is in operation passes through the opening 20B of the fixing plate 20, and is cast upon the light receiving surface of the image-capturing device 22. The fixing plate 20 has multiple holes 20A for fastening. The positions of the holes 24A provided in the mount board 24 may overlap the positions of the holes 20A provided in the fixing plate 20. Accordingly, with the screws inserted through the holes 24A of the mount board 24 and the holes 20A of the fixing plate 20, these substrates can be fixed to the camera stay.

Figure 4:
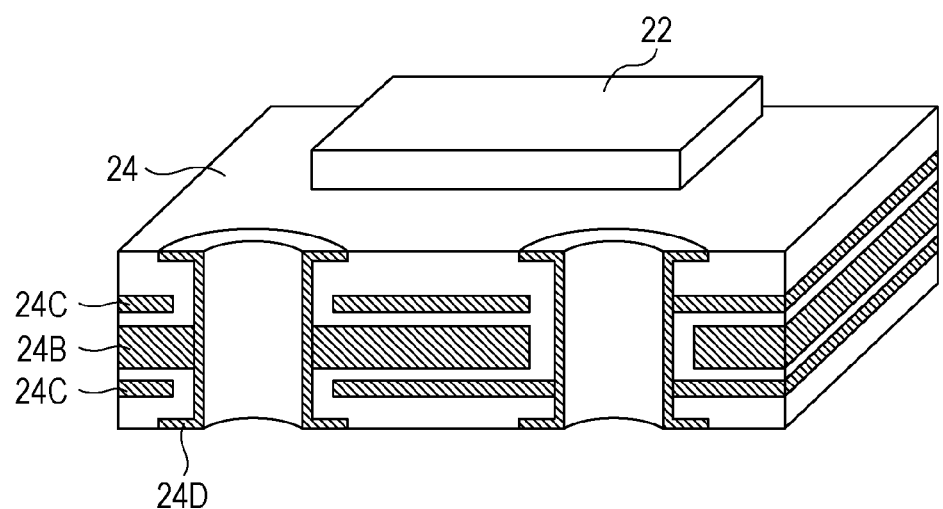
FIG. 4 is a enlarged perspective view of the stereo camera unit according to the implementation of the present invention, illustrating the mount board on which the image-capturing device is mounted.

With reference to FIG. 4, the present implementation employs a metal core substrate as the mount board 24 mounting the image-capturing device 22. Here, the metal core substrate is a substrate employing metal material as a base material serving as a core, and the heat radiation property and the heat expansion coefficient thereof are similar to those of the metal substrate.

The mount board 24 has a layered core base material 24B in the central portion in the thickness direction, and the mechanical strength and the heat radiation of the entire substrate are achieved by the core base material 24B. Like the camera stay 12 described above, the material of the core base material 24B may employ aluminum or alloy mainly including aluminum. The core base material 24B is the thickest conductive layer of conductive layers provided in the mount board 24. The shape of the core base material 24B may be so-called solid shape that is not patterned, or may be a shape divided into multiple pieces.

On the upper surface and the lower surface of the core base material 24B, pattern layers 24C are laminated with insulating layers made of resin interposed therebetween. The pattern layer 24C is made of conductive material, and functions as wires for connecting the mounted devices with each other or the device with the outside. On the upper surface of the mount board 24, a pattern for mounting the image-capturing device 22 is disposed. A through electrode 24D is provided to penetrate the mount board 24, and with this through electrode 24D, each pattern is electrically connected.

The image-capturing device 22 is fixed onto the upper surface of the mount board 24 by surface mounting with conductive fixing agent such as solder, and is electrically connected via the conductive fixing agent with the pattern formed on the upper surface of the mount board 24. The image-capturing device 22 is a wafer level package (WLP) or a resin seal package, and is fixed to the upper surface of the mount board 24 through applying, heating, and melting conductive fixing agent such as solder to a terminal unit introduced to the lower surface or the side.

In the present implementation the metal core substrate is employed as the mount board 24 on which the image-capturing device 22 is mounted as illustrated in FIG. 2, and therefore, even when the stereo camera unit in operation is affected by a temperature change, the change in the positions of the image-capturing device 22 with respect to the lens 14 caused by the temperature change is prevented.

More specifically, in the present implementation, the image-capturing device 22 is mounted on the mount board 24, and this mount board 24 is fixed to the inside of the camera stay 12 with the screws, so that the position of the image-capturing device 22 with respect to the camera stay 12 is fixed. Therefore, when the thermal expansion rates of the mount board 24 and the camera stay 12 are different, upon the temperature change are different, and the position of the image-capturing device 22 with respect to the camera stay 12 is changed. As a result, the relative position of the lens main body 14A fixed to the camera stay 12 with respect to the image-capturing device 22 is also changed, and therefore, it is difficult to accurately calculate the distance on the basis of the image captured by the image-capturing device 22.

In view of such problem, the present implementation uses the metal core substrate having the core base material 24B made of the same metal material as the camera stay 12 for the mount board 24. In this case, "made of the same metal material" means that a metal material which has the highest component ratio is the same. Accordingly, the thermal expansion rate of the mount board 24 can be made substantially the same as the camera stay 12. For example, when aluminum is employed as material of the above camera stay 12, and aluminum is also employed as the material of the core base material 24B of the mount board 24, the thermal expansion coefficients of them both are $22 \times 10^{-6}$/degrees. Therefore, with reference to FIG. 2, even when the stereo camera unit according to the present implementation is in operation and affected by a temperature change, the camera stay and the mount board 24 mounting the image-capturing device 22 have almost a same level of thermal expansion, and therefore, the relative position of the image-capturing device 22 with respect to the camera stay 12 is not changed. Therefore, the relative positional relationship between the image-capturing device 22 and the lens 14 fixed to the camera stay 12 is not changed, and thus it is possible to accurately detect an object detection and calculate a distance thereto, on the basis of the image data obtained by the image-capturing device 22.

For similar reasons, shear force is prevented from acting on the screw fixing the mount board 24 to the camera stay 12.

Further, major portion of the metal core substrate in the thickness direction of the substrate is made of metal material. Therefore, creep described in Related Art can be prevented from occurring. As a result, even when the mount board 24 is fixed to the camera stay 12 with fastening member such as screw, creep does not occur at positions where the screws re fastened, whereby loosening due to the lost axial force of the screw is suppressed. This also suppresses the problem of optical axis deviation caused by the change.

Still further, in the present implementation, metal material such as aluminum is employed as the fixing plate 20 interposed between the mount board 24 and the camera stay 12. The camera stay 12, the fixing plate 20, and the mount board 24 are disposed to be in contact through their planes. Therefore, the camera stay 12 and the mount board 24 are thermally coupled via the fixing plate 20 which have superior thermal conductivity, and thus the camera stay 12 and the mount board 24 exhibit substantially a same temperature change in accordance with a temperature change of the external atmosphere to which the stereo camera unit 10 is exposed. This also prevent the problem caused by the change.

The present implementation described above, for example, can be changed as follows.

In the present implementation described above, metal mainly including aluminum is employed as the material of the camera stay 12 and the core base material of the mount board 24, but other metal may also be employed. For example, metal mainly including copper, steel, stainless steel, and the like can be employed as the material of the camera stay 12 and the core base material of the mount board 24.

In the present implementation, the same material is used for the camera stay 12 and the core base material of the mount board 24. However, the materials of them do not necessarily have to be same. Specifically, when metal mainly including aluminum is employed as the materials of the both them, the rates of aluminum included therein may be slightly different.

The invention claimed is:

1. A stereo camera unit comprising:
a camera stay;
a pair of lenses fixed to the camera stay and configured to condense light incident from the outside;
image-capturing devices disposed in association with the pair of lenses and receiving light condensed by the lenses; and
mount boards each mounting corresponding one of the image-capturing device and being fixed to the camera stay,
wherein each mount board is a metal core substrate that includes a plurality of conductive layers and an insulating layer between the plurality of conductive layers in a thickness direction of the mount board,
wherein the plurality of conductive layers comprises a core base material and a pattern layer, the pattern layer is provided on a surface of the core base material and electrically connected to the image-capturing device, and,
wherein the core base material is a thickest conductive layer of a plurality of conductive layers, and
wherein a same metal material has a highest component ratio in each of the core base material and the camera stay, and a thermal expansion rate of the mount board is substantially a same as a thermal expansion rate of the camera stay in order to accurately detect an object and calculate a distance of the object based on image data obtained by the image-capturing devices.

2. The stereo camera unit according to claim 1, wherein the image-capturing devices are CMOS sensors.

3. The stereo camera unit according to claim 2, wherein the mount board is fixed to the camera stay via multiple fastening members.

4. The stereo camera unit according to claim 2, wherein the image-capturing devices are surface-mounted on the mount board.

5. The stereo camera unit according to claim 3, wherein the camera stay is made of metal mainly including aluminum; and
the metal mainly including aluminum is employed as the core base material of the metal core substrate.

6. The stereo camera unit according to claim 3, wherein the image-capturing devices are surface-mounted on the mount board.

7. The stereo camera unit according to claim 1, wherein the mount board is fixed to the camera stay via multiple fastening members.

8. The stereo camera unit according to claim 7, wherein the camera stay is made of metal mainly including aluminum; and
the metal mainly including aluminum is employed as the core base material of the metal core substrate.

9. The stereo camera unit according to claim 7, wherein the image-capturing devices are surface-mounted on the mount board.

10. The stereo camera unit according to claim 1, wherein the camera stay is made of metal mainly including aluminum; and
the metal mainly including aluminum is employed as the core base material of the metal core substrate.

11. The stereo camera unit according to claim 2, wherein the camera stay is made of metal mainly including aluminum; and
the metal mainly including aluminum is employed as the core base material of the metal core substrate.

12. The stereo camera unit according to claim 1, wherein the image-capturing devices are surface-mounted on the mount board.

13. The stereo camera unit according to claim 1, wherein the plurality of conductive layer further comprises a through electrode penetrating the mount board, and the pattern layer is electrically connected to the image-capturing device via the through electrode.

* * * * *